(12) United States Patent
Yamashita et al.

(10) Patent No.: US 9,030,413 B2
(45) Date of Patent: May 12, 2015

(54) AUDIO REPRODUCING APPARATUS, INFORMATION PROCESSING APPARATUS AND AUDIO REPRODUCING METHOD, ALLOWING EFFICIENT DATA SELECTION

(75) Inventors: Kosei Yamashita, Kanagawa (JP); Shinichi Honda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1060 days.

(21) Appl. No.: 12/035,503

(22) Filed: Feb. 22, 2008

(65) Prior Publication Data
US 2008/0204408 A1    Aug. 28, 2008

(30) Foreign Application Priority Data
Feb. 26, 2007   (JP) .................................. 2007-046050

(51) Int. Cl.
*G06F 17/30* (2006.01)
(52) U.S. Cl.
CPC .... *G06F 17/30775* (2013.01); *G06F 17/30743* (2013.01); *G06F 17/30749* (2013.01)
(58) Field of Classification Search
USPC ......... 707/609, 705, 722, 724, 723, 728, 732, 707/737; 715/704, 710–711; 345/157
See application file for complete search history.

(56) References Cited

U.S. PATENT DOCUMENTS

| | | | |
|---|---|---|---|
| 6,121,969 A * | 9/2000 | Jain et al. | 715/850 |
| 6,788,829 B1 * | 9/2004 | Murakawa et al. | 382/305 |
| 6,829,394 B2 * | 12/2004 | Hiramatsu | 382/291 |
| 6,883,146 B2 * | 4/2005 | Prabhu et al. | 715/854 |
| 6,888,537 B2 * | 5/2005 | Benson et al. | 345/173 |
| 7,643,012 B2 * | 1/2010 | Kim et al. | 345/173 |
| 7,735,018 B2 * | 6/2010 | Bakhash | 715/782 |
| 8,330,717 B2 * | 12/2012 | Kawakami et al. | 345/157 |
| 2003/0164827 A1 * | 9/2003 | Gottesman et al. | 345/419 |
| 2003/0179231 A1 * | 9/2003 | Kamiwada et al. | 345/757 |
| 2004/0268451 A1 * | 12/2004 | Robbin et al. | 999/999.999 |
| 2005/0160377 A1 * | 7/2005 | Sciammarella et al. | 715/838 |
| 2006/0097995 A1 * | 5/2006 | Nagayasu | 345/173 |

(Continued)

FOREIGN PATENT DOCUMENTS

| | | | | |
|---|---|---|---|---|
| JP | 2001125767 | 5/2001 | | |
| JP | 2006018794 | 1/2006 | | |
| KR | 1020060028977 | * | 3/2006 | ................ G06F 3/41 |

OTHER PUBLICATIONS

Office Action for corresponding Japanese Application 2007-046050 dated Mar. 17, 2009.

*Primary Examiner* — William Boddie
*Assistant Examiner* — Alecia D English
(74) *Attorney, Agent, or Firm* — Matthew B. Dernier, Esq.; Gibson & Dernier LLP

(57) ABSTRACT

An image display field, a whole map display field, a cursor are displayed on the music data selection screen. In the image display field is displayed an array of images which belong to one partition that can be displayed at a time and which are included in an array of images which represent whole audio data and is defined fixedly in advance. In the whole map display field is displayed a whole map indicating a display-area guide which shows where a partition being displayed now is located in the whole array and indicating a trajectory line which represents the trajectory of the cursor in the past. A plurality of pieces of music data represented by an image, which the cursor indicates, and images located around the image are reproduced concurrently.

15 Claims, 6 Drawing Sheets

(56) References Cited

U.S. PATENT DOCUMENTS

| | | |
|---|---|---|
| 2006/0259877 A1* | 11/2006 | Kaminagayoshi ............ 715/858 |
| 2006/0287990 A1* | 12/2006 | Yoon ................................ 707/3 |
| 2007/0130002 A1* | 6/2007 | Moran et al. .................... 705/14 |
| 2007/0277123 A1* | 11/2007 | Shin et al. ...................... 715/863 |
| 2008/0062139 A1* | 3/2008 | Hotelling et al. ............. 345/173 |
| 2008/0307337 A1* | 12/2008 | Marinkovich et al. ........ 715/764 |
| 2009/0011831 A1* | 1/2009 | Yamada .......................... 463/37 |

* cited by examiner

FIG.4

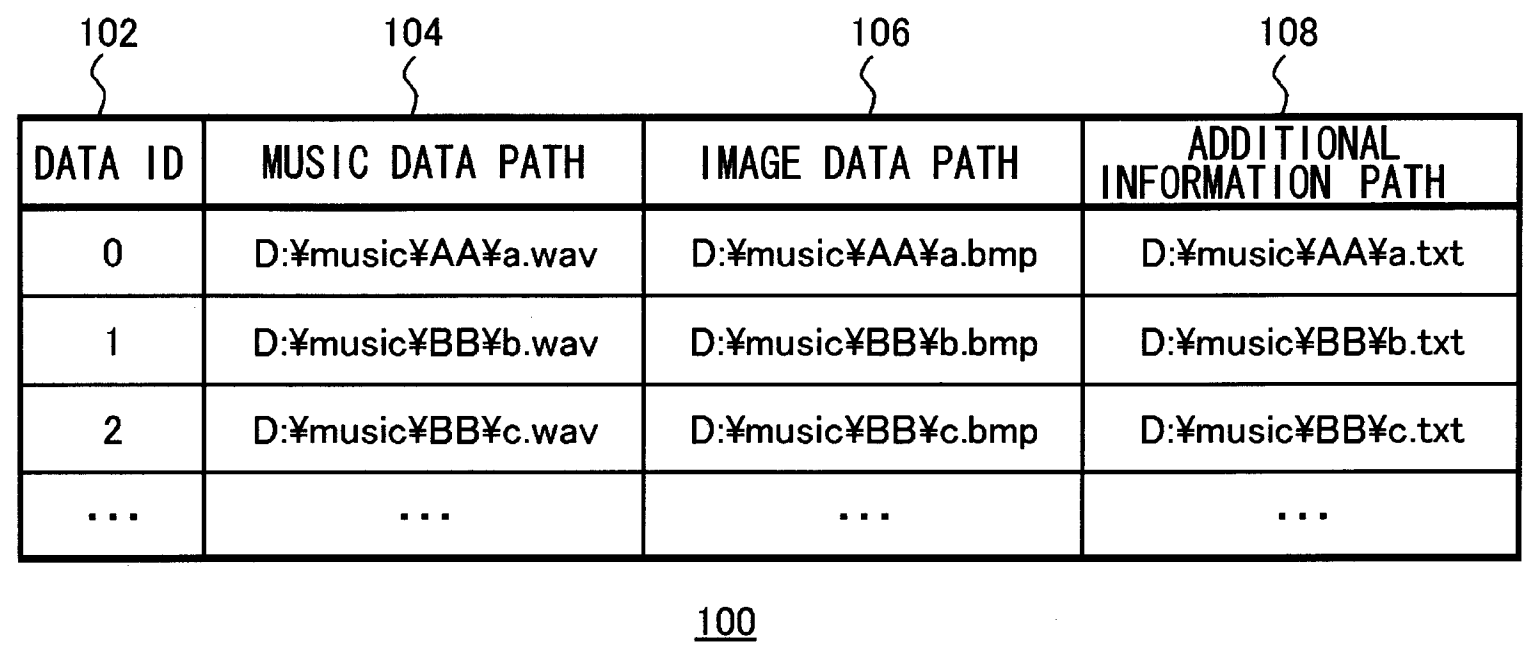

| DATA ID | MUSIC DATA PATH | IMAGE DATA PATH | ADDITIONAL INFORMATION PATH |
|---|---|---|---|
| 0 | D:¥music¥AA¥a.wav | D:¥music¥AA¥a.bmp | D:¥music¥AA¥a.txt |
| 1 | D:¥music¥BB¥b.wav | D:¥music¥BB¥b.bmp | D:¥music¥BB¥b.txt |
| 2 | D:¥music¥BB¥c.wav | D:¥music¥BB¥c.bmp | D:¥music¥BB¥c.txt |
| ... | ... | ... | ... |

102　104　106　108　100

AUDIO REPRODUCING APPARATUS, INFORMATION PROCESSING APPARATUS AND AUDIO REPRODUCING METHOD, ALLOWING EFFICIENT DATA SELECTION

BACKGROUND OF THE INVENTION

1. Field of the Invention

The present invention generally relates to a technology for treating a plurality of pieces of electrical data and more particularly, to an audio reproducing apparatus and an information processing apparatus outputting selected data among a plurality of pieces of audio data or electrical data, and an audio reproducing method utilized in the apparatuses.

2. Description of the Related Art

With the developments of information processing technology in recent years, it has become easy to obtain an enormous number of contents easily via recording mediums, networks, broadcasting wave or the like. For example, in case of music contents, downloading from a music distribution site via a network is generally practiced in addition to purchasing a recording medium such as a CD (Compact Disc) or the like that stores music contents. A diversification in obtaining methods, including image recording, audio recording or creating by a user himself/herself, leads to increasing contents or electrical data stored in PCs, reproducing apparatuses, or recording mediums.

Therefore, a technology becomes necessary to search through an enormous number of contents for a desired content easily. For example, displaying image data as thumbnails enables a user to view the whole contents without opening each file which records data, by displaying a reduced-sized image list. In a similar way, displaying the types of numerous pieces of electrical data with different icons allows a user to narrow down the candidates of desired data, visually.

Meanwhile in case that the user would like to know the content of audio data, such as music or the like, which can not be laid out visually, it ends up using textual information, such as a title or the name of a performer, as a clue. However, the number of pieces of audio data owned by an individual, such as music contents or the like, is continuously increasing and it is not easy to find out desired data from such a list of textual information.

Besides, even in case of visual data, there are a lot of data with many details which are not appropriate to be displayed as thumbnails, for example, textual data or graphic data with small details. Also with those kinds of data, desired data has to be searched for only by textual information, such as, a title, the date and time of creation or the like, as a clue. Thus, it becomes more and more difficult to find the desired data as the number of pieces of stored data increases.

SUMMARY OF THE INVENTION

In this background, the general purpose of the present invention is to provide a technology for selecting data among a plurality of pieces of electrical data, efficiently.

According to one embodiment of the present invention, an audio reproducing apparatus is provided. The audio reproducing apparatus comprises an interface for allowing a user to select one of a plurality of pieces of audio data. The apparatus includes a display unit operative to set and display images associated with respective audio data, in an array; an input unit operative to receive an input for selecting a position on a screen a reproducing unit operative to reproduce at least a part of audio data corresponding to the image determined according to the selected position on the screen, wherein the display unit lays out and displays images while not changing the position of respective images in the array once displayed, thereafter.

"An image associated with audio data" may represent any of an image symbolizing audio data, an image related to audio data, visualized textual information or the like, or an optional combination of these.

According to another embodiment of the present invention, an information processing apparatus is provided. The information processing apparatus comprises an interface for allowing a user to select one of a plurality of pieces of electronic data. The apparatus comprises a display unit operative to display images associated with respective electronic data in a predetermined array; and an input unit operative to receive an input for selecting one of the displayed images, wherein the display unit further displays, on the array of images, a graphic figure indicating an input selection history received by the input unit.

The "electronic data" here may be audio data, document data, image data, a computer program, a folder, an archive or the like, as far as it has a certain unit and is accessible for each unit by making a selection.

According to another embodiment of the present invention, an audio reproducing method is provided. The audio reproducing method comprises: setting and displaying images associated with a plurality of pieces of audio data, in an array on the screen while not changing the array; receiving an input for selecting a position on the screen; and reproducing audio data corresponding to an image determined according to the selected position on the screen.

Optional combinations of the aforementioned constituting elements, and implementations of the invention in the form of methods, apparatuses, systems, computer programs, may also be practiced as additional modes of the present invention.

BRIEF DESCRIPTION OF THE DRAWINGS

FIG. 4 shows an exemplary data configuration of a music information table storing information on music data according to the present embodiment.

DETAILED DESCRIPTION OF THE INVENTION

Figure 1:
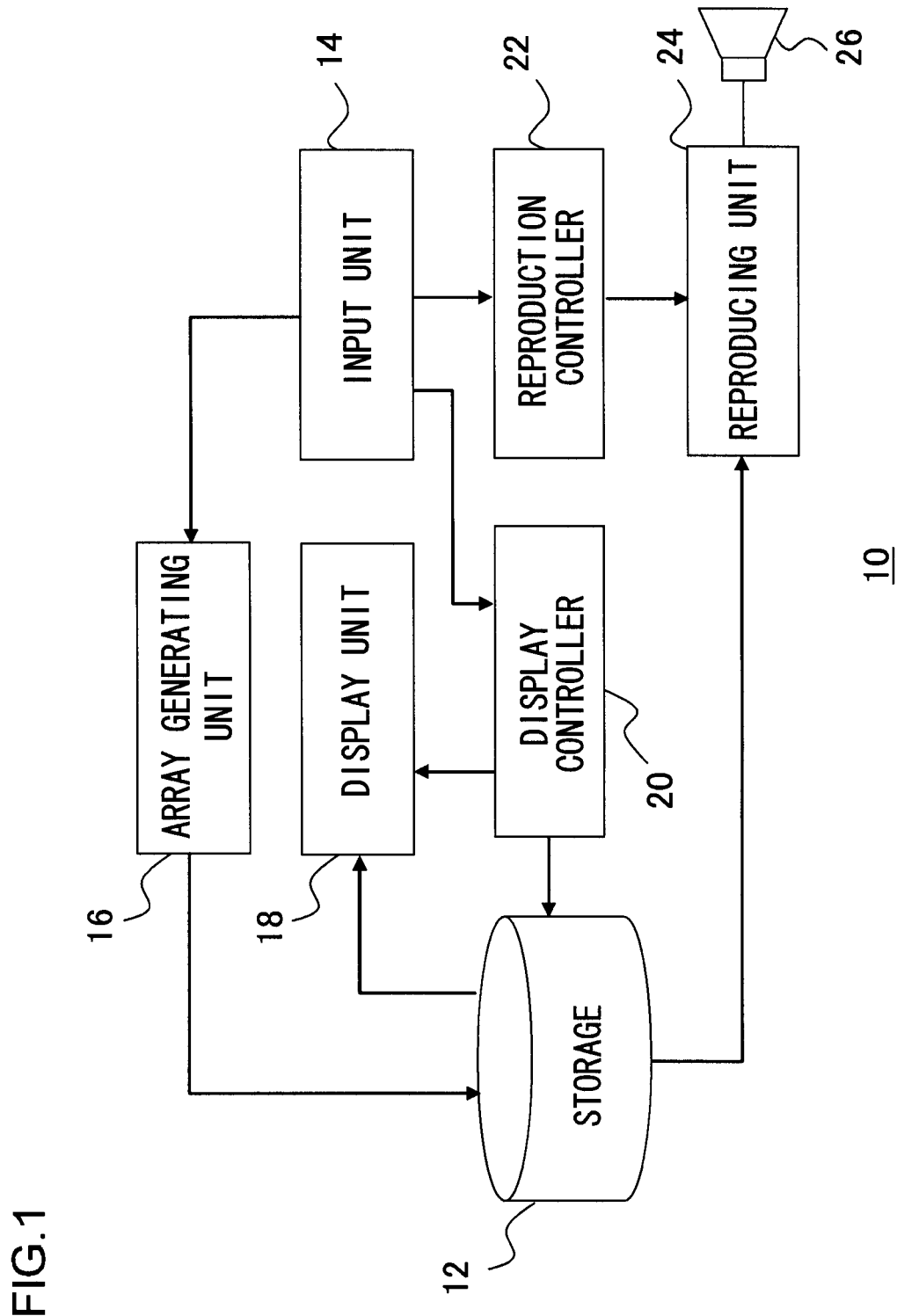
FIG. 1 shows an entire configuration of an audio reproducing apparatus according to the present embodiment.

FIG. 1 shows an entire configuration of an audio reproducing apparatus according to the present embodiment. The audio reproducing apparatus 10 allows the user to select one piece of audio data or to check the whole data while listening to a plurality of contents of audio data stored by the user, i.e., sounds it self, as though viewing images displayed as thumbnails. For example, it occasionally happens that a phrase in the middle of a certain song occurred to a person and the person would like to identify the song and listen to the whole song.

However, the more numerous the stored songs are, the more difficult it is to find a song to be reproduced, with a conventional audio player or the like, since the song can be only selected by using textual information, such as an album title, the name of a performer, a song title, or the like. Even with such a case, the present invention enables a user to identify the desired song efficiently while checking the sound itself. Further, when a user does not have a specific phrase in mind but obscurely feels like listening to a song which fits the feeling of the moment, or would like to listen to the entirety of the songs to know what kind of songs there are which have been stored in the past, the present invention realizes a "zapping" of sound which allows ambiguity when selecting a content.

Therefore, images that symbolize audio data are displayed in a fixed array according to the present invention. Then a content to be reproduced is selected using position information as a clue, other than textual information such as a title, the name of a performer or the like. Utilizing the human characteristics that it is easier to memorize the positions of objects than to memorize the names or the like of many objects, data is narrowed down efficiently by using the display position in user's memory, even if the titles or the like of the data is ambiguous. In case of searching or seeking by sorting based on a title or the like, just memorizing a part of the title wrongly results in difficulty in reaching the desired data. Meanwhile, in case of the memory on positions, even if there exists some deviation, it is possible to reach the desired object by searching the vicinity of the memorized position. Thus influence brought by an error in memorizing is small.

Further, a cursor which moves on the array of images is also displayed according to the present embodiment. By concurrently reproducing audio data symbolized by images displayed in a specific vicinity of the cursor moved by the user, the efficiency in narrowing down candidates is further improved. This function enables the sound zapping described above as well.

In addition to the display position of an image, reproduction history is also displayed so that contents to be reproduced can be narrowed down based on whether or not the user has reproduced the content recently, and if reproduced, based on the frequency of the reproduction as well. Representing the reproduction history by the trajectory of the cursor on the fixed array of images helps searching for audio data using its position. In the following explanations, audio data represents, but is not limited to, music data. The audio data may represent other data for sound signals as well, such as, human voice in comic story telling or a meeting, environmental sound, sound data included in broadcasting wave (e.g., TV or the like) or audio data included in image data stored in a DVD or the like.

The audio reproducing apparatus 10 includes a storage 12 which stores music data, image data associated with respective music data or the like, an input unit 14 through which the user input an instruction, an array generating unit 16 which determines an array of images to be displayed, a display unit 18 which displays images according to the determined array, a display controller 20 which controls the switching of displaying on the display unit 18 according to the instruction input by the user, a reproduction controller 22 which controls the switching of contents to be reproduced according to the instruction input by the user, a reproducing unit 24 which reproduces music data, and an output unit 26 which outputs the reproduced music data.

The audio reproducing apparatus 10 may be configured with integral or locally connections like a music reproducing apparatus such as a portable player, a personal computer or the like. In this case, the storage 12 may be a recording apparatus or a recording medium used commonly, such as, a hard disk, a flash memory, a CD, a DRAM or the like, or an optional combination thereof. Further, the array generating unit 16, the display controller 20, the reproduction controller 22 and the reproducing unit 24 may be configured with a processor unit or the like. The output unit 26 may be an internal speaker, a speaker or an earphone connected externally, or the like. The storage 12 may be configured with a hard disk or the like in a server connected with other functional blocks via a network. Further, the music data stored in the storage 12 may be encoded using an encoding method used commonly, such as MP3, WMA or the like.

Images which are stored in the storage 12 in association with music data are preferably images which symbolize music data and can be understood visually and intuitively, such as, an image of an album jacket, one frame in a promotion video, a moving image in a promotion video, a picture of a person who sent the music data or the like. However, the images may be image data generated from textual information, such as a title or the like as well. Further, the storage 12 also stores information on the array of images determined by the array generating unit 16 and/or information on trajectory of the cursor. According to the present embodiment, music data is associated with the position of an image as described above, so that it is preferable that position of an image which has been once stored is not updated. However, the position can be updated in case that, e.g., new music data is added, the user desires the position to be updated, or the like.

The input unit 14 provides an interface with the audio reproducing apparatus 10 and allows the user to input an instruction for moving the cursor on the array of images displayed on the display unit 18, an instruction for determining the array of images, an instruction for starting reproduction, an instruction for completion, or the like. The input unit 14 may be any of commonly-used input apparatuses, such as a mouse, a keyboard, a trackball, a button, a joystick, a touch panel and a touch pen, or the like.

The array generating unit 16 determines the array of the images and stores the array into the storage 12 when, e.g., the audio reproducing apparatus 10 is started for the first time or the user inputs an instruction for updating through the input unit 14. The array can be determined based on the condition specified by the user from a multiple-choice list. For example, the user may manually determine the location of images one by one, array data which has been downloaded or acquired from a recording medium in advance may be read out and used without modification, the contents may be automatically sorted according to a certain rule based on the attached information to each music data stored in the storage 12, etc. When one audio reproducing apparatus 10 is shared by a plurality of users, the array information may be generated for each user or one user may generate the array information with a variety of patterns. In such a case, array information is stored in association with the login name of users, the name of the array, or the like.

Since the number of images which can be displayed at a time is limited, the array generating unit 16 further partitions the determined array into partitions each displayed on the display unit 18 at a time and stores array information on the partitions into the storage 12 as well. According to the present embodiment, the music data is memorized with the position. Thus it is preferable to switchably display partitions than scroll display of the array of all the images. This allows a user to narrow down the music data initially according to the position of a partition in the array of all images and then to narrow down the data further according to a position in the partition. Thus the data can be searched efficiently. For the same reason, loop scrolling, with which the right end of the array of all the images is connected to the left end, is preferably not used. The array information of the images and the array information of the partitions may be included in the same table. For example, for each ID number indicating the row/column of a partition, data on images included in the partition and the array of those images may be associated with each other.

The display unit 18 displays images which belong to one partition, based on the array information of the images stored in the storage 12. A partition to be displayed is switched according to the movement of the cursor. For example, when the cursor moves to the right end of a certain partition, the right adjacent partition replaces the partition being displayed. This allows the user to overlook the whole array just like peering into the array of images from a window which hops consecutively according to the movement of the cursor.

The display unit 18 further displays a whole map which indicates where in the array of all images the partition being displayed is located. This enables the user to search for music data based on the memory of position in the array of all images. The display unit 18 further displays a trajectory with a line on the whole map based on information on the trajectory of the cursor stored in the storage 12. The trajectory displayed here is of the actual movement of the cursor projected on the array of all images. As described above, displaying the trajectory of the cursor on the array of all the images allows the user to narrow down positions based on the memory of when the user reproduced the content in the past, and to narrow down music data in the narrowed-down position. All the display on the display unit 18 mentioned above is performed by acquiring a) the movement of the cursor acquired by the input unit 14, and b) the array information, the information on trajectory or the like stored in the storage 12, under the control of the display controller 20.

The reproduction controller 22 acquires an image displayed at a pre-determined location from the cursor on the display unit 18, defines music data symbolized by the image as a content to be reproduced. The reproduction controller 22 then transmits the information to the reproducing unit 24. The content to be reproduced may be a single piece of music data symbolized by one image displayed at the point which the cursor indicates, or may be a plurality of pieces of music data further including music data symbolized by a plurality of images displayed around the point. In the latter mode, the reproducing unit 24 reads a plurality of music data from the storage 12, performs reproducing process, such as decoding or the like, in parallel and performs mixing. Consequently, a plurality of audio signals is output in a mixed state from the output unit 26. The signals to be output may be of an arbitrary format, such as monophonic, stereophonic, 5.1 channel or the like, depending on setting.

The apparatus may also be configured to allow the user to choose whether a single piece of music data is to be reproduced or a plurality of pieces of music data are to be reproduced, and in the latter case, which boundary is used for sorting out images that symbolize music data when determining music data to be reproduced. In case of reproducing a plurality of pieces of music data symbolized by images displayed in a certain region around the cursor, it is possible to reach the desired music data more quickly compared with the case where a piece of music data is reproduced and checked one by one. Further, the entirety of the stored music data can be grasped in a short time period even if information on desired music is obscure.

In case of reproducing a plurality of pieces of music data concurrently, the mere mixing of decoded audio signals may cause sound that is hard to hear. To perform zapping through the stored music data efficiently or to identify the desired data in a short period, respective audio signals, which are output concurrently, are preferably perceived separately. However, a certain sound may not be perceived due to masking by other audio signals, depending on the volume or melody of the sound.

Therefore, according to the present embodiment, when a plurality of pieces of music data are reproduced concurrently, a certain process is performed before mixing so that the user can perceive respective audio signals separately. However, this mode is given only by way of an example of the present embodiment. Another configuration may also be adopted. For example, the user himself/herself can select a mode from a plurality of modes, e.g., a mode where a single piece of music data is to be reproduced or a mode where the aforementioned process is not performed even when a plurality of pieces of music data are reproduced concurrently.

Figure 2:
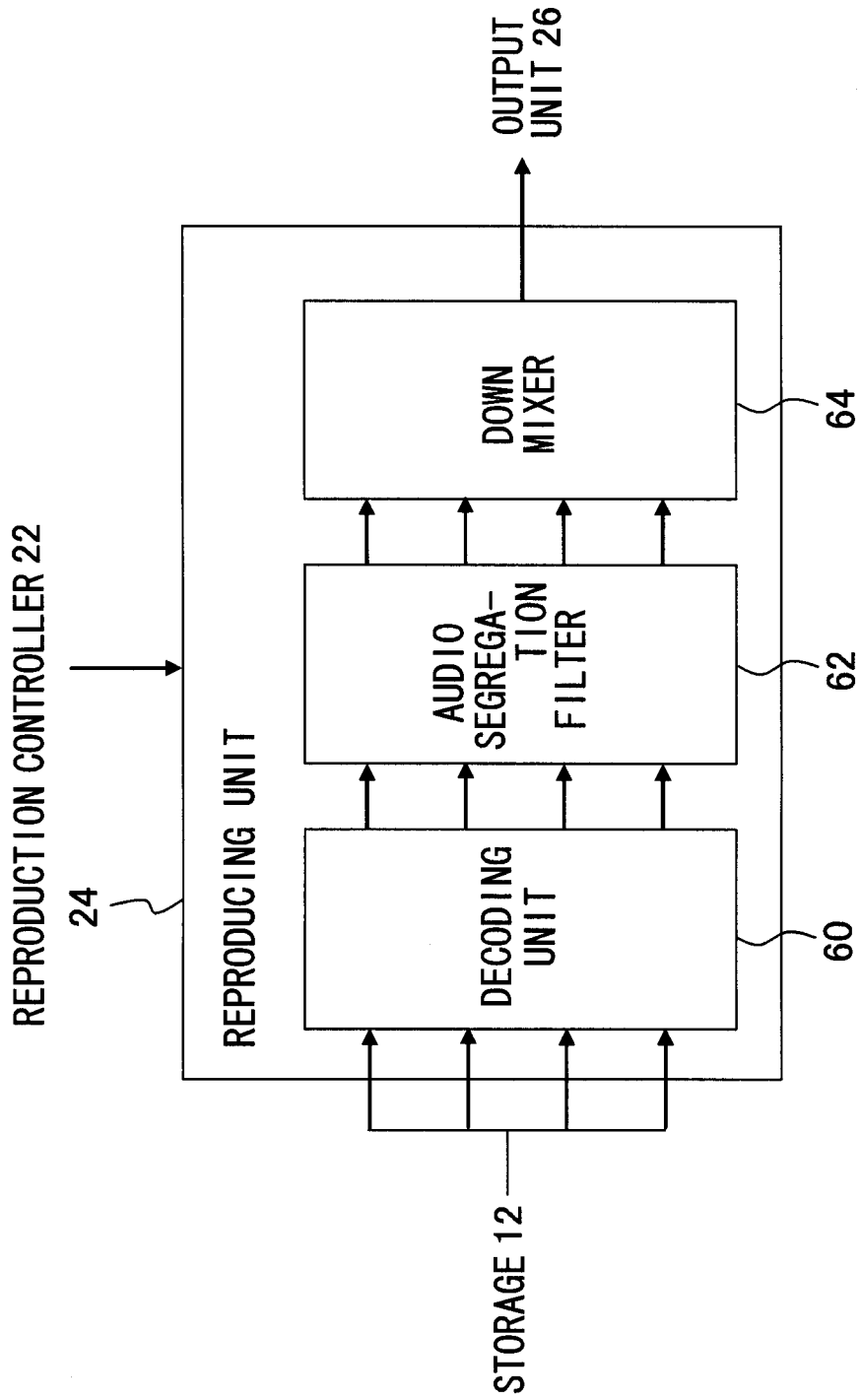
FIG. 2 shows a configuration of a reproducing unit in case of performing aural segregation processing of a plurality of sound signals according to the present embodiment.

FIG. 2 shows a configuration of the reproducing unit 24 in case of performing aural segregation processing on a plurality of sound signals. The reproducing unit 24 includes a decoding unit 60, an audio segregation filter 62 and a down mixer 64. The decoding unit 60 decodes a plurality of pieces of music data to be reproduced, which are acquired from the storage 12, into audio signals. The audio segregation filter 62 performs processing so that a plurality of audio signals are heard separately. The down mixer 64 mixes a plurality of filtered audio signals and generates an output signal having a desired number of channels.

The decoding unit 60 decodes a plurality of music data to be reproduced concurrently, in parallel. Therefore, a plurality of processors may be laid out according to the number of pieces of music data. Alternatively, one processor may perform decoding the data while switching data for each time slice. The combination of these methods may be adopted as well.

The audio segregation filter 62 is shown as one block in FIG. 2. However, the filter may include a plurality of filters. The audio segregation filter 62 may be, for example, a frequency-band-division filter, a time-division filter, a modulation filter, a processing filter, a localization-setting filter or the like, or an optional combination thereof.

The frequency-band-division filter divides audible band of frequencies into a plurality of blocks and allocates each block to at least one of the plurality of audio signals. Then the filter extracts only a frequency component, which belongs to the allocated block, from each audio signal. For example, by setting the boundary frequency of a block to the boundary frequency of one of twenty-four critical bands of Bark's scale, the frequency component of a certain audio signal is not easily masked by the frequency component of other audio signals. This promotes segregation at the inner ear level.

The time-division filter changes the amplitude of audio signals at a common period such that peaks thereof occur at different times. That is, a time slot is allotted to each of the plurality of audio signals. The period is set in the range of several tens of milliseconds to a several hundreds of milliseconds. This helps the audio signals to be perceived separately by the time resolution ability of inner ear.

The modulation filter gives a particular change to all or some of the audio signals periodically. For example, the filter may modulate the amplitude or the frequency characteristic of the audio signals. The modulation may be produced in a short time period in pulse form, or may be produced so as to vary gradually in long time period, e.g., a several seconds. When applying the same modulation to a plurality of audio signals, the peak timing for a sound signal is set differently from each other. Alternatively, a noise such as a clicking sound or the like may be added, a filtering process implemented by an audio filter used commonly may be applied or a sound image may be shifted from side to side periodically. A clue to realize auditory stream of the audio signals is given by combining those modulations, applying another modulation for a certain audio signal, shifting timings, etc.

The processing filter constantly performs a processing on all or some of the audio signals. The processing may be one of or a combination of audio processing, such as echoing, reverbing, pitch-shifting, or the like, that can be implemented by an effecter used commonly. Frequency characteristic may be constantly set differently from that of original audio signal. Naturally, in case of applying processing to a plurality of audio signals, the type of processing or the level of processing for an audio signal shall be set differently from each other. The localization-setting filter gives different positions of sound images to all of the respective audio signals.

By inputting a plurality of audio signals which are output from the decoding unit 60 into such a filter as described above, a plurality of audio signals that have been processed are output from the audio segregation filter 62. Which audio signal, among the plurality of audio signals decoded by the decoding unit 60, is to be input into which filter or what kind of processing is to be performed in the filter is controlled by allowing the reproduction controller 22 to define setting for each filter. The reproduction controller 22 may specify music data symbolized by an image displayed at, e.g., a point which the cursor indicates and may define the setting of the filter so that the music data can be heard prominently compared to other music data being reproduced. In this case, for example, more frequency bands are allocated to the audio signal which it is desired to emphasize, by the frequency-band-division filter. Alternatively, the position of a sound image for the music data is set to the front of the user by the localization-setting filter. All the audio signals to be reproduced may be output on the equal condition regardless of the position of the cursor depending on the setting by the user. In this case too, by allowing the audio segregation filter 62 to operate, each sound signal can be perceived separately.

The down mixer 64 performs a variety of adjustments if necessary, then mixes a plurality of audio signals and outputs the signal as an output signal having a predetermined number of channels. The number of the channels may be fixed, or may be changeable hardware-wise or software-wise by the user. The down mixer 64 may be configured with a down mixer used commonly.

Figure 3:
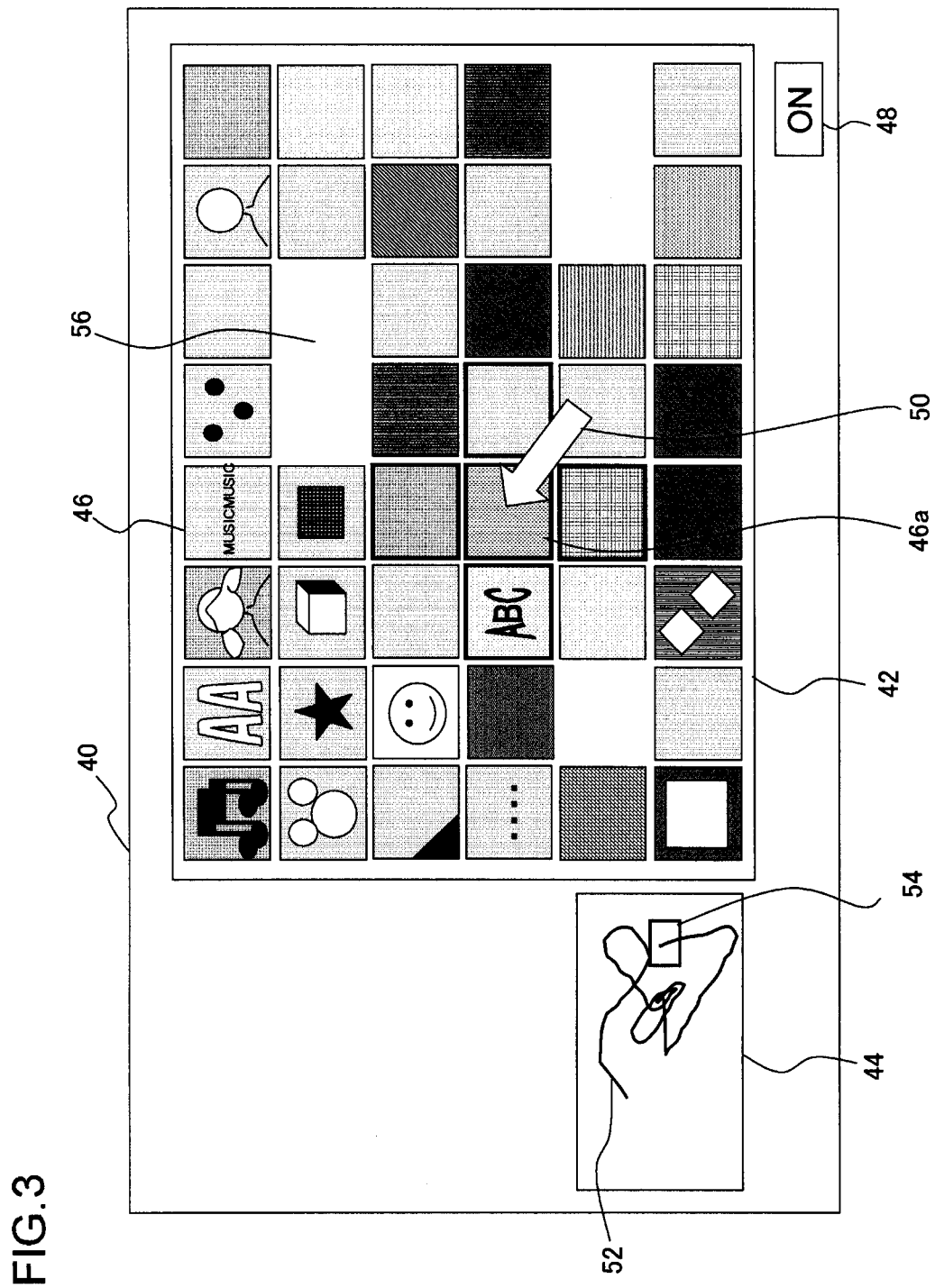
FIG. 3 shows an exemplary configuration of a screen image displayed on a display unit according to the present embodiment.

FIG. 3 shows an exemplary configuration of a screen image displayed on the display unit 18. A music data selection screen 40 includes a image display field 42 and a whole map display field 44. On the image display field 42, an array of images which belong to one partition that can be displayed at a time, among the array of all images generated by the array generating unit 16 is displayed. In FIG. 3, it is assumed that forty-eight images 46, which are respective components of a matrix which may include of six rows and eight columns, can be displayed at a time. However, the arrangement of the images in the image display field 42 is not limited to a matrix form and it may include an arbitrary form as a whole, e.g., a circle, a polygon or the like. The cursor 50, which can be moved by the user using the input unit 14, is also displayed on the matrix.

In the whole map display field 44, the whole map which indicates a display-area guide 54 and a trajectory line 52 is displayed. The display-area guide 54 indicates where the partition, being displayed on the image display field 42 now, is located on the array of all images. The trajectory line 52 indicates the trajectory of the cursor 50 up to now and/or a predetermined point in time. The whole map may be structured so that grid lines which indicate boundaries of all the partitions are displayed and the partition being displayed now in the image display field 42 is highlighted.

FIG. 3 illustrates a state where five pieces of music data are to be reproduced, by way of an example. The five pieces of music data are symbolized by an image 46a, which the cursor 50 indicates, and four images which are located above, below, to the right and to the left of the image and shown as rectangles drawn with a thick line. In another example, music data symbolized by an image may be defined to be reproduced if at least a part of the image is displayed within a predetermined radius from the point which the cursor 50 indicates. Alternatively, only the music data of the image 46a indicated by the cursor 50 may be defined as data to be reproduced. In case that a plurality of pieces of music data are to be reproduced, the audio segregation filter 62 may be started to filter music signals so that they are heard separately, as described above. Further, only the music data symbolized by the image 46a may be defined as music data to be heard prominently. Alternatively, perceivability of the music data may be changed in multi steps according to distance or angle from the point which the cursor 50 indicates or according to area of the image included in the circle which denotes contents to be reproduced.

In the music data selection screen 40 shown in FIG. 3, a segregation-filter-start button 48 is also provided so that the user can switch whether or not to start the audio segregation filter 62 easily. In the example of FIG. 3, displaying the segregation-filter-start button 48 as "ON" indicates that the audio segregation filter 62 is in operation. By allowing the user to indicate and push the button using the cursor 50, the button is displayed as "OFF" and the operation of the audio segregation filter 62 can be stopped. This switching is detected by the reproduction controller 22 and is reflected in the setting of the audio segregation filter 62 in the reproducing unit 24 or the setting of a circuit (not shown) which connects the decoding unit 60 and the audio segregation filter 62.

When the user moves the cursor 50 using the input unit 14, the reproduction controller 22 detects the movement and changes the music data to be reproduced according to the movement of the cursor 50. In this process, the music data to be reproduced may be switched when the cursor 50 crosses the boundary between adjacent images or may be changed gradually according to the point which the cursor 50 indicates. The latter mode is effectively utilized in case that a plurality of pieces of music data are reproduced and that such a process, which changes the way audio signals sound according to the distance from the point which the cursor 50 indicates, is applied. For example, in case that the cursor 50 is moving away from an image, an audio signal corresponding to the image may gradually fade away or the sound image may be localized at a greater distance, while in case of approaching, the audio signal sound may gradually increase or the sound image may become dispersed or enlarged at a closer distance as though an audio source approaches. This can bring a feeling that the image and the sound are linked to each other.

The example mentioned above describes the case where the reproduction controller 22 always monitors the movement of the cursor and switches the music data to be reproduced.

However, the apparatus may also be configured to switch the music data to be reproduced only when a certain instruction is input by other means than the movement of the cursor, e.g., when the user moves the cursor and then clicks it. Further, both of these modes may be adopted changeably.

A blank area 56 where no image exists can be defined as a component of the array in case that, e.g., the user determines the array of images manually with the array generating unit 16. Even when a plurality of music data are reproduced depending on the position of the cursor, certain music data can be reproduced always separately by, e.g., surrounding an image symbolizing the music data with the blank areas 56. By allowing the blank area 56 to be set according to the preference of the user, the number of pieces of music data to be reproduced at a time can be flexibly increased or decreased.

In case that an image symbolizing a music data is an image from an album jacket, data on a plurality of songs included in the same album is associated with an identical image. In such a case, identical images as many as the number of songs can be listed simply. Alternatively only one image may be displayed corresponding to songs bundled for each album as a unit and when the image is selected, music data may be reproduced from the first track in the album. In the latter case, by displaying the image as though a plurality of images are overlapped in an area for one image or by displaying the image with a three-dimensional appearance, the image may indicate that the image includes a plurality of pieces of music data. In such a case, songs to be reproduced may be switched according to the number of clicking through the input unit 14 after the cursor 50 is moved onto the image. Naturally, a plurality of songs may be reproduced at a time.

When the cursor 50 is moved by user's manipulation through the input unit 14, the display controller 20 extends the trajectory line 52 in the whole map display field 44 according to the movement and stores that information into the storage 12 sequentially. When the cursor 50 reached at any of the ends of the image display field 42, the display controller 20 detects that and replaces the array of images to be displayed in the image display field 42 with that of the adjacent partition. At the same time, the display-area guide 54 in the whole map display field 44 is also moved to a position which indicates the partition.

Storing the information on the trajectory of the cursor into the storage 12 enables a user to read trajectory information of the past from the storage 12 and to display the information again in the whole map display field 44 when the user re-starts the operation of the audio reproducing apparatus 10 which has been once terminated. In an actual configuration, the storage 12 which has this function may be configured by a combination of a high-speed memory, such as a DRAM or the like and a nonvolatile memory, a hard disk or the like. Data, successively stored in the high-speed memory while the audio reproducing apparatus 10 is in operation, may be stored into the nonvolatile memory or the like when, e.g., the operation completes, so as to be reused when the apparatus is started next time.

Displaying the trajectory line 52 in the whole map display field 44 allows the user to grasp reproduction history, which is time series data, associated with positions on the array of all images. Since the array of all the images is laid out for grasping music data in association with its location in the first place, the trajectory line 52 enables a user to associate memory of the past with music data visually via the position as an intermediary. This allows the user to also take information on his/her reproduction history into account easily when searching for desired data with a position as a clue. This improves searching efficiency to a great degree. For example, data can be easily narrowed down based on the user's memory, telling the user that, for example, a target song is positioned around the bottom right corner in the array of all images and the song has not been reproduced recently.

By depicting the trajectory of the cursor with a line, the frequency of reproduction can be understood based on the density of the lines. Further, the sequence of reproduction in the past can be basically traced by following the trajectory line 52 leading to the display-area guide 54. However, it becomes difficult to trace the line if the lines are densely laid out or complicated. Further, the trajectory line 52 depicting the trajectory information which is stored in the last operation is naturally discontinuous with the trajectory line 52 of this time. Thus it is difficult to figure out how far back in reproduction history each trajectory line 52 goes back. Therefore, the display controller 20 changes the way to present a line of the trajectory line 52, depending on a date and time when the trajectory information is stored into the storage 12 or the like.

More specifically, the attribute of the color of a line is changed depending on a date when the trajectory information is stored, or the like. The color may be changed depending on the date or the attribute of the color may be changed continuously according to the elapse of time since the information has been stored. For example, a time constant may be defined for elapsed time beforehand and the thickness or the like of the color of the trajectory line 52 is changed continuously, so that the trajectory line 52 older than the time constant is assimilated into a background color, which enables a user to give an impression as if wheel ruts are fading away along the elapse of time. Alternatively, each trajectory line 52 may be displayed switchably by specifying the time period when trajectories have been stored.

Displaying the trajectory line 52 is also effective when checking quickly which songs have not been reproduced recently, etc, as well as improving efficiency in searching for a desired song as described above. That is, the songs can be easily zapped through by moving the cursor 50 to an area where the trajectory lines 52 are not displayed in the whole map display field 44.

By moving the cursor 50 on the whole map display field 44 and clicking an arbitrary point in the field, a partition which includes the point may be displayed in the image display field 42. This enables a user to switch the display in a short time to another partition which is far away from the partition now being displayed in the image display field 42.

The trajectory information to be displayed in the whole map display field 44 is not limited to lines such as the trajectory lines 52 but may be represented by circles, rectangles, polygons or the like. The frequency of reproduction or the elapse of time since the last reproduction may be depicted by, for example, displaying such graphic figures for each partition and changing their size, shape, color, density or the like. Alternatively, only the attribute of a color may be continuously changed while displaying no specific graphic figure. Further, by storing the trajectory information while associated with a login name or the like, other person's trajectory information who has manipulated the audio reproducing apparatus 10 may also be displayed on condition that the attribute of a color or the like is changed based on the person who manipulates the apparatus.

FIG. 4 shows an exemplary data configuration of a music information table which indicates information on music data, is stored into the storage 12 and is referred to by the display controller 20 and the reproduction controller 22. The music information table 100 includes a data ID field 102, a music-data-path-field 104, an image-data-path field 106 and an additional-information-path field 108. In the data ID field 102, is stored an ID number which is given for each music data uniquely. In the music-data-path-field 104 are stored the name of a file on respective music-data and the location in the storage 12 where the file is stored. In the image-data-path field 106 are stored the name of a file on image data which symbolizes respective music data and the location in the storage 12 where the file is stored. In the additional-information-path field 108 are stored the name of a file on additional-information for respective music data and the location in the storage 12 where the file is stored.

The additional-information file is a file in which information, necessary when the audio reproducing apparatus 10 reproduces each music data, is described as appropriate. For example, an RMS value for each song is stored as additional information and the reproduction controller 22 normalizes sound volume by referring to the RMS value when reproducing music data so as to prevent sound volume from increasing abruptly depending on a song to be reproduced. Besides that, a frequency band characteristic for each song may be recorded in advance and the setting may be defined so that the characteristic frequency band is allocated as much as possible when dividing frequency band in the audio segregation filter 62. Other values necessary or useful for the setting in the audio segregation filter 62 may be recorded as well.

Further, a time when the characteristic melody starts in each song may be stored beforehand and all the songs may be reproduced from the time when characteristic melody starts when searching. By storing such additional information, music data can be reproduced so as to be heard more easily, or music data can be searched effectively. Other than those, in the additional information file may be described information which determines the order of the array when generating the array of images, for example, the date and time of the ripping, the name of a performer or the like. Therefore information to be described in the additional-information file may include any of a) information originally attached to the music data, b) information acquired when the music data is stored into the storage 12, c) the result of analysis performed by the reproduction controller 22 when the data is reproduced for the first time, d) information defined by the user or the like.

Figure 5:
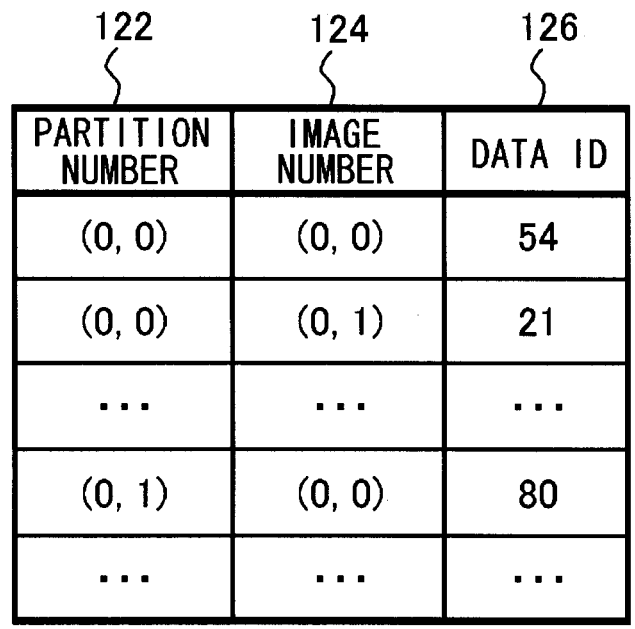
FIG. 5 shows an exemplary data configuration of an image-array table storing layout information of all images according to the present embodiment.

FIG. 5 shows an exemplary data configuration of an image-array table which is generated by the array generating unit 16, is stored into the storage 12 and indicates location information of all images. The image-array table 120 includes a partition number field 122, an image number field 124 and a data ID field 126. The partition number field 122 stores an ID number pre-determined for each component of a partition matrix which constitutes the whole array. In the example shown in FIG. 5, a combination consisting of (row number, column number) of the matrix is defined as an ID number. The image number field 124 stores ID numbers pre-determined for respective elements of an image matrix which constitutes a partition, i.e., respective display positions of images which are displayed in the image display field 42 at a time. The data ID field 126 stores ID numbers given to music data which is represented by images placed at respective positions, i.e., ID numbers described in the data ID field 102 in the music information table 100.

In the example shown in FIG. 5, ID numbers to be stored in the image number field 124 are defined as (row number, column number) of the image matrix in the similar manner as the ID numbers of the partitions. In case of the image display field 42 shown in FIG. 3 by way of an example, there are forty-eight areas of six rows and eight columns, where respective images are to be displayed. Thus, forty-eight elements of image matrix from (0, 0) to (5, 7) are included in the element (0, 0) of the partition matrix. By associating each element of the image matrix to an ID number given to music data, an array of all images can be generated while referring to the music information table 100. In case of setting a blank area 56 in the array of images, the data ID field 126 corresponding to the element in the image-array table 120 is, for example, set to blank.

Figure 6:
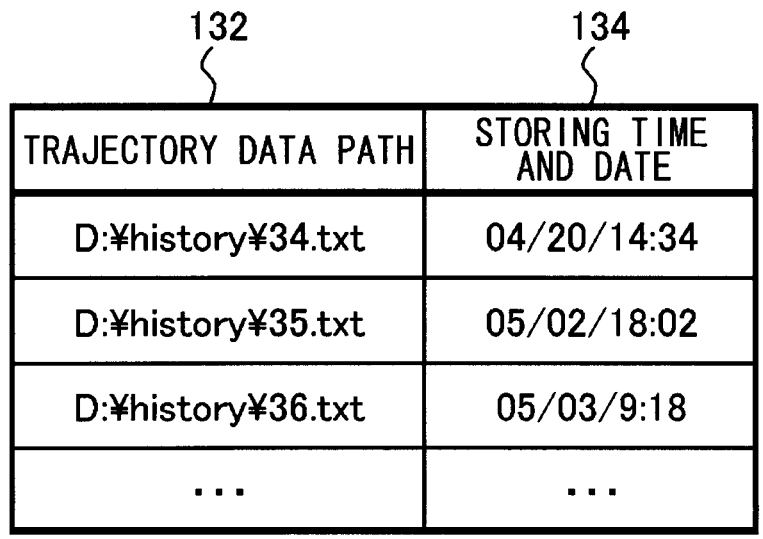
FIG. 6 shows an exemplary data configuration of a trajectory information table storing trajectory information of a cursor according to the present embodiment.

FIG. 6 shows an exemplary data configuration of a trajectory information table 130 which indicates trajectory information of the cursor and is stored into the storage 12 by the display controller 20. The trajectory information table 130 includes a trajectory-data-path field 132 and a storing-date-and-time field 134. The FIG. 6 shows the case where trajectory data which has been stored sequentially into the high-speed memory is stored into the nonvolatile memory before the completion of the processing by the audio reproducing apparatus 10. In this case, in the trajectory-data-path field 132, are stored the file name of a data file describing the trajectory of the cursor and the location in the storage 12 where the file is stored. In the storing-date-and-time field 134, is stored the date and time, when the file is stored into the storage 12. For example, the display controller 20 changes the attribute of the color of the trajectory line 52 indicated by a file stored in the trajectory-data-path field 132 based on the date of storing written in the storing-date-and-time field 134 and displays the line in the whole map display field 44, accordingly.

The data structures of respective tables are shown only by way of examples in FIG. 4-FIG. 6. Other fields may further be defined or the tables may be simplified depending on a function to be set and a data format to be retained. For example, the storing-date-and-time field 134 shown in FIG. 6 may be replaced by two fields which record the starting time of reproduction and the stopping time of the reproduction, respectively and the attribute of the color may be changed continuously depending on the accumulated recording time of the trajectory of the cursor. Alternatively, without setting information on date and time of storing in FIG. 6, a file on the trajectory data may be stored as an image data on trajectory line having different color every time the storage 12 stores the trajectory information. In this case, images from these image files may be just superposed when displayed in the whole map display field 44. Also when the data representing the trajectory is stored in the form of combination of the time and the position of the cursor, the storing-date-and-time field 134 is unnecessary.

Figure 7:
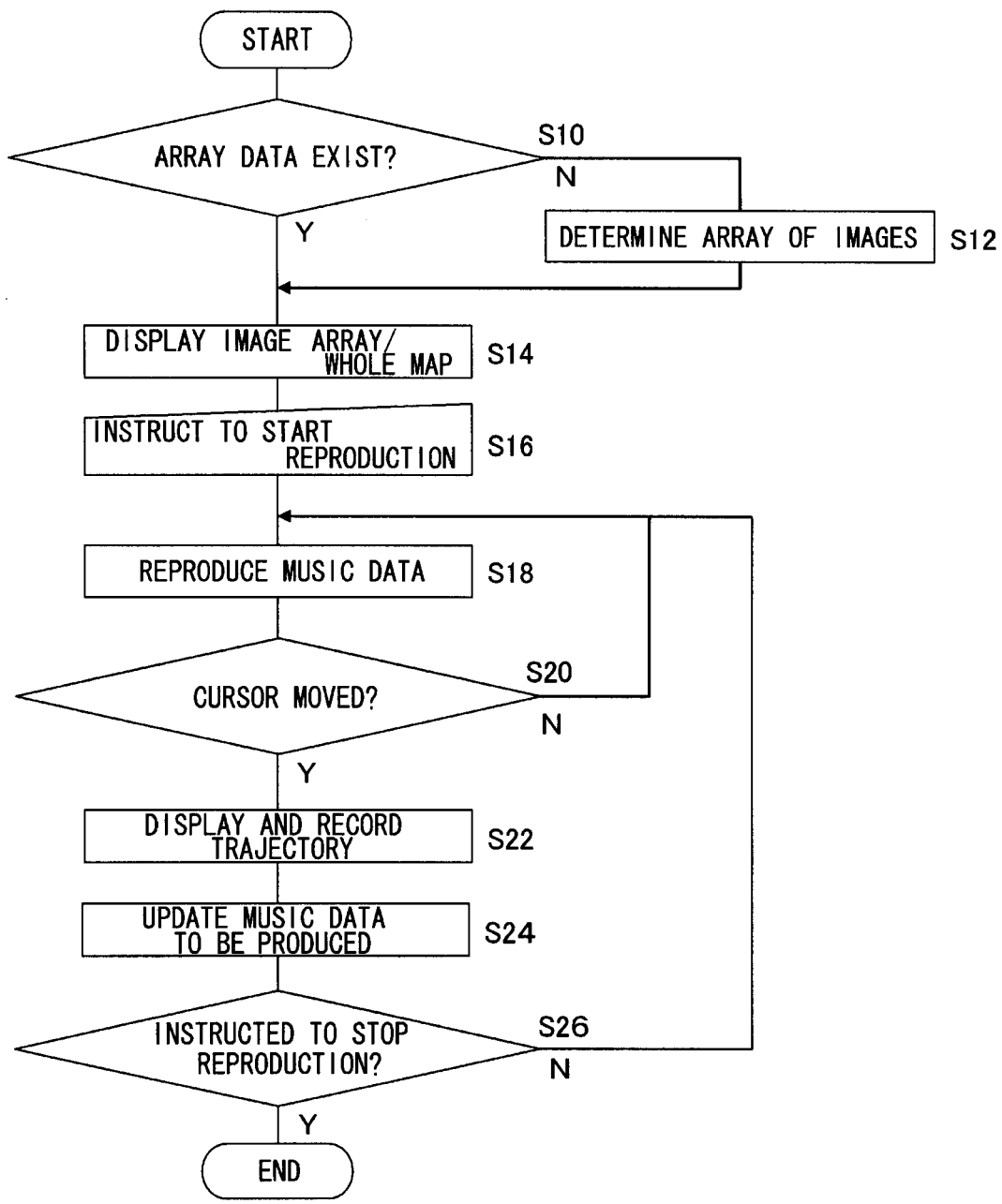
FIG. 7 shows a flowchart illustrating a procedure for reproducing processing performed by an audio reproducing apparatus according to the present embodiment.

The explanation of the operation of the audio reproducing apparatus 10 implemented with the structure described above will now be given. FIG. 7 shows a procedure of reproducing processing performed by the audio reproducing apparatus 10. Initially when the user starts the audio reproducing apparatus 10, it is checked whether or not the array data of images, i.e., the image-array table 120 shown in FIG. 5 is stored in the storage 12 (S10). If the array data is not stored (N in S10), the array generating unit 16 determines the array (S12). In this step, a procedure may be adopted where the user chooses whether the array is determined manually or automatically based on any of the rules prepared in advance. Further, an option for reading the array from a recording medium or the like may also be provided. The combination of those may be adopted as well, for example, after an array is determined automatically, the array may be changed to an array of preference manually.

In case of determining manually, the array generating unit 16 displays icons of the images stored in the storage 12 one after another with the base of the matrix. When the user forms the array by dragging and dropping the icons of the images one by one, the array generating unit 16 refers to the array and assigns the ID number of music data to the data ID field 126 in the image-array table 120 sequentially.

In case of determining automatically, the array generating unit 16 determines the layout by, for example, sorting based on the additional information file registered in the additional-information-path field 108 in the music information table 100 or information recorded in music data itself and creates the image-array table 120. Information that serves as the criteria in determining the order of the array here represents, e.g., the date and time of ripping, the date of releasing, the name of a performer, the name of a composer, a genre, a tempo, tone, the duration of performance, a song title, an album title, the type of codec, bit-rate, the frequency of reproduction in the past, a present position on the chart, or the like. Other than these, any additional information which is acquired at the moment may be utilized, e.g., information on connection with another song with which the song is linked based on a certain criterion.

When the array of images is determined by creating the image-array table 120 (S12), or the image-array table 120 is preexistent (Y in S10), the display unit 18 displays one partition of the array of images in the image display field 42, under the control of the display controller 20. Concurrently, the whole map indicating the display-area guide 54 is displayed in the whole map display field 44 (S14). If the trajectory information table 130 is stored in the storage 12 at this moment, the display unit 18 further displays the trajectory line 52 reflecting the trajectory data in the whole map display field 44.

In this state, the input unit 14 receives the input instruction for starting reproduction of music data from the user (S16). The reproduction controller 22 identifies one of or a plurality of pieces of music data based on the point which the cursor 50 indicates and information on reproduction range defined in the storage 12 or the like. Then the reproducing unit 24 reproduces the music data, accordingly (S18). During the reproduction, the display controller 20 and the reproduction controller 22 monitor the movement of the cursor 50 (N in S20, S18). On detecting that the cursor is moved (Y in S20), the display controller 20 controls the display unit 18 to extend the trajectory line 52 in the whole map display field 44 according to the movement of the cursor and records the information on trajectory into the storage 12 additionally (S22). Meanwhile, the reproduction controller 22 updates the setting of music data to be reproduced or the setting of the audio segregation filter 62 if necessary. Then the reproducing unit 24 reproduces the updated music data, accordingly (S24).

The processing from step S18 to step S24 is repeated until the user inputs an instruction to stop reproduction through the input unit 14 (N in S26). When the input instruction to stop reproduction is received, the reproduction processing ends (Y in S26).

According to the present embodiment described above, audio data is recorded in association with a position for displaying an image which represents the data, as an intermediary, and the image is displayed accordingly. This allows the user to keep track of the music data using information on position which is easy to memorize, in addition to textual information such as a song title, the name of a performer or the like. Thus, desired music data can be searched for effectively even if an enormous quantity of music data is stored. Further, it is possible to check sound itself easily, which is a content of data, by switching audio data to be reproduced, in synchronization with the movement of the cursor which moves on the array of images. Consequently, an auditory input can be given to the user so as to be linked to a visual input directly. This functions as, so to say, "thumb nails of sounds" that has a similar effect as thumbnails of images used commonly.

Reproducing and outputting concurrently a plurality of audio data, represented by a plurality of images displayed around the point which the cursor indicates, enables a user to get a quick overview of the whole audio data being stored, with the same feel as experienced when glancing at images displayed as thumbnails. The combination of concurrent reproduction of a plurality of pieces of music data and a memory of a display position improves the searching efficiency dramatically, compared to searching for only using textual information. Further, the apparatus enables a user to check quickly by sound itself what kind of data is included in the stored audio data, etc. Hearing the audio data which the user had no intention to listen to, the user can also enjoy the entertainment brought by chance, for example, recollection of his/her memory which has been lost or switch of the mood.

Further, according to the present embodiment, the trajectory of the cursor which has moved on the array of images is displayed as the reproduction history up to now and/or a predetermined time. That the reproduction history can be represented visually as the trajectory, is also an effect obtained by associating music data with the display position of an image. By representing the trajectory visually, it becomes easy to grasp which area has been reproduced a lot and which area not. The embodiment also enables a user to change display mode, such as the attribute of the color of a line, which represents the trajectory, or the like based on the time series of the trajectory. In case of searching for desired music data, the searching can be performed effectively without memorizing exact textual information of the data because memory on whether the data has been reproduced recently can also be used as a new clue, in addition to memory of position. Further, stored data can be re-realized or rediscovered effectively since it is possible to reproduce data based on the history, for example, by zapping audio data intensively which has not been reproduced recently.

Given above is an explanation based on the exemplary embodiments. These embodiments are intended to be illustrative only and it will be obvious to those skilled in the art that various modifications to constituting elements and processes could be developed and that such modifications are also within the scope of the present invention.

For example, according to the present embodiment, the line which represents the trajectory is displayed in the whole map which is different from the array of images. Alternatively, the trajectory line may be displayed on the array of images itself in case that the cursor moves only within the array of images which is displayed at a time, for example in case that the array of images is displayed for each music category. In this case, by decreasing the brightness of the original array of images and by displaying only a trajectory-lined part with the original brightness, a visual effect can be obtained in which the images retrieves the original brightness as the reproduction frequency becomes higher. Further, the image display field 42 and the whole map display field 44 may be displayed switchably in different pages.

The method of representing an access history with a trajectory can be applied not only to audio data but also to an array of a variety of icons of files, such as document files, image files, software or the like. For example, in case of document files, by recording the history of accessed files and by connecting icons with a line in the order of the accessing, the history can be represented visually as a trajectory. In this case, too, the operation of searching for a desired file based on the memory of accessing in the past or the operation of checking files which have not been accessed recently can be performed effectively and intuitively. Not only music data but also other data owned by individuals has been inflating, thus representing the access history visually by graphic figures is as effective as described above in the present embodiment.

Further, the reproduction controller 22 may re-create the reproduction of audio data by reading one piece of data on trajectory stored in the past and substituting the movement of the cursor for the trajectory. The trajectory data read out in this process shall have a format for storing the time and the position of the cursor sequentially. For example, if it is set that a single piece of music data is to be reproduced at a time, if the cursor is moved on the assumption that the reproduction will be re-created in the future and if the movement is stored as data on trajectory, a new function of reproducing data, included in the massive amount of stored data, in the order of one's preference can be easily achieved. In this case, the order can be defined easily only with the movement of the cursor. Further, a variety of patterns can be easily created with a small-sized data, unlike the case of re-arranging the order of the music data itself, and can be reproduced.

What is claimed is:

1. An audio reproducing apparatus comprising an interface for allowing a user to select one of a plurality of pieces of audio data, the apparatus comprising:
    an array generation unit operative to generate array information based on a condition specified by the user from a multiple-choice list and to store the array information associated with identification information of the user in a storage medium, the array information indicating an array of images respectively associated with the plurality of pieces of audio data;
    a display unit operative to lay out and display the images in an array on a screen according to the array information associated with the user;
    an input unit operative to receive an input from the user for selecting one or more positions among the images on the screen, which selection represents a desire by the user to execute the audio data associated with the selected images and which selection is determined by the user and not predetermined by another entity; and
    a reproducing unit operative to concurrently play at least two or more of the plurality of pieces of audio data corresponding to a plurality of images displayed within a predetermined boundary from the position on the screen and selected via the input unit, wherein
    the display unit lays out and displays the images while not changing positions of the respective images in the array once displayed,
    thereafter, the input unit receives sequentially positions of a cursor as the selected positions on the screen as movement of the cursor displayed on the screen, where the selected positions represent the executed audio data associated with the selected images,
    the reproducing unit changes audio data to be executed continuously according to changes in the selected position on the screen, and
    the display unit is further operative to: (i) store a trace of the sequential and selected positions of the cursor moving on the array of images in a storage medium so as to accumulate a reproduction history for the user over one or more separate uses of the reproducing apparatus by such user, (ii) determine whether there are one or more past traces for such user stored in the storage medium when the audio reproducing apparatus is operated by such user, (iii) read out the past traces from the storage medium, and (iv) display a graphic figure on or near the displayed array of images representing the traces, regardless of a current position of the cursor, where the graphic figure shows an entirety of at least one of the one or more past traces as a free-form line in a single image, such that the free form line represents the sequential positions of the user's manipulation of, and movement of, the cursor over the array of images on the display, wherein the free form line is determined by the user in accordance with the user's selection of the one or more positions among the images on the screen and by the user's desire to execute the audio data associated with the selected images, and which selection is determined by the user and not predetermined by another entity.

2. The audio reproducing apparatus according to claim 1, wherein the reproducing unit decodes the respective parts of the plurality of pieces of audio data to be played concurrently and performs a process for allowing at least some of a plurality of audio signals obtained by the decoding to be separately aurally perceived by the user.

3. The audio reproducing apparatus according to claim 2, wherein the reproducing unit performs a process for changing aural perceivability levels of the audio signals obtained by the decoding according to respective distances from the selected position on the screen to respective ones of the plurality of images displayed within the predetermined boundary that are associated with the respective parts of the plurality of pieces of audio data.

4. The audio reproducing apparatus according to claim 1, wherein the display unit switchably displays respective partitions of the array of images according to which partition the position of the cursor is in, the partitions being formed by dividing the array of images in a manner determined by each user.

5. The audio reproducing apparatus according to claim 4, wherein the display unit further displays a display-area guide which indicates where the partition being concurrently displayed within the whole array of images.

6. The audio reproducing apparatus according to claim 1, wherein the display unit stores the trace in the storage medium in association with storage time information, and when there are a plurality of the past traces to be displayed, the display unit changes a mode of the graphic figure of each of the past traces according to the storage time information so that the user grasps the user's reproduction history.

7. The audio reproducing apparatus according to claim 6, wherein the graphic figure is a line having a predetermined color, the line indicating the trace of the cursor and the density of the line being changed continuously according to an elapse of time from the storage time so that a part of the line older than a predetermined time constant is assimilated into a back ground color.

8. The audio reproducing apparatus according to claim 1, wherein an area without an image can be set in a middle of the array of images displayed by the display unit depending on the user's intention.

9. The audio reproducing apparatus according to claim 1, wherein the reproducing unit refers to one of the previously stored traces and executes at least some of the plurality of pieces of audio data corresponding to images determined based on the one of the previously stored traces, instead of the position of the cursor, and on the array of images both of which are associated with the user and displayed in the array of images.

10. The audio reproducing apparatus according to claim 1, wherein the array information is generated by the array generation unit based on manual input from the user related to a location of the images.

11. The audio reproducing apparatus according to claim 1, wherein the array generation unit acquires the array information by downloading.

12. An information processing apparatus comprising an interface for allowing a user to select one of a plurality of pieces of electronic data, the apparatus comprising:
- a display unit operative to display images associated with the respective plurality of pieces of electronic data in an array on a screen according to an array information stored in a storage medium associated with the user; and
- an input unit operative to receive sequential positions of a cursor which is moved on the screen for allowing the user to select one or more images among the displayed images, which selection represents a desire by the user to execute the electronic data associated with the selected images and which selection is determined by the user and not predetermined by another entity,
- wherein the display unit is further operative to: (i) store a trace of the sequential and selected positions of the cursor moving on the array of images in a storage medium so as to accumulate a reproduction history for the user over one or more separate uses of the information processing apparatus by such user, (ii) determine whether there are one or more past traces for such user stored in the storage medium when the information processing apparatus is operated by such user, (iii) read out the past traces from the storage medium, and (iv) display a graphic figure on or near the displayed array of images representing the traces, regardless of a current position of the cursor, where the graphic figure shows an entirety of at least one of the one or more past traces as a free-form line in a single image, such that the free form line represents the sequential positions of the user's manipulation of, and movement of, the cursor over the array of images on the display, wherein the free form line is determined by the user in accordance with the user's selection of the one or more positions among the images on the screen and by the user's desire to execute the audio data associated with the selected images, and which selection is determined by the user and not predetermined by another entity.

13. The information processing apparatus according to claim 12, wherein the information processing apparatus stores the trace in the storage medium in association with storage time information, and when there are a plurality of the past traces to be displayed, the display unit changes a mode of the line representing each of the past traces according to the storage time information.

14. An audio reproducing method comprising:
- generating array information depending on each user's preference and to store the array information associated with identification information of the user in a storage medium, the array information indicating an array of images respectively associated with a plurality of pieces of audio data;
- setting and displaying the images in an array on a screen according to the array information associated with the user;
- receiving an input from the user for selecting one or more positions among the images on the screen, which selection represents a desire by the user to execute the audio data associated with the selected images and which selection is determined by the user and not predetermined by another entity;
- concurrently playing at least two or more of the plurality of pieces of audio data corresponding to a plurality of images displayed within a predetermined boundary from the selected position on the screen,
- transmitting a sequential input of positions of a cursor as selected positions on the screen upon movement of the cursor on the screen,
- continuously changing audio data that is concurrently played, in accordance with changes of the selected positions on the screen,
- storing a trace of the sequential and selected positions of the cursor moving on the array of images in a storage medium so as to accumulate a reproduction history for the user over one or more separate uses by such user,
- determining whether there are one or more past traces for such user stored in the storage medium during a new use by such user,
- reading out the past traces from the storage medium, and
- displaying a graphic figure on or near the displayed array of images representing the traces, regardless of a current position of the cursor, where the graphic figure shows an entirety of at least one of the one or more past traces as a free-form line in a single image, such that the free form line represents the sequential positions of the user's manipulation of, and movement of, the cursor over the array of images on the display, wherein the free form line is determined by the user in accordance with the user's selection of the one or more positions among the images on the screen and by the user's desire to execute the audio data associated with the selected images, and which selection is determined by the user and not predetermined by another entity.

15. A computer program product comprising:
- a first module which generates array information depending on each user's preference and to store the array information associated with identification information of the user in a storage medium, the array information indicating an array of images respectively associated with the plurality of pieces of audio data;
- a second module which sets and displays the images in an array on a screen according to the array information associated with the user;
- a third module which receives an input from the user for selecting one or more positions among the images on the screen, which selection represents a desire by the user to execute the audio data associated with the selected images and which selection is determined by the user and not predetermined by another entity;
- a fourth module which concurrently plays at least two of the plurality of pieces of audio data corresponding to a plurality of images displayed within a predetermined boundary from the selected position on the screen wherein
- the third module receives sequentially positions of a cursor as selected positions on the screen during movement of the cursor on the screen,
- the fourth module changes audio data to be executed continuously according to changes in the selected position on the screen, and
- the second module further: (i) stores a trace of the sequential and selected positions of the cursor moving on the array of images in a storage medium so as to accumulate a reproduction history for the user over one or more separate uses by such user, (ii) determine whether there are one or more past traces for such user stored in the storage medium during a new use by such user, (iii) read out the past traces from the storage medium, and (iv) display a graphic figure on or near the displayed array of images representing the traces, regardless of a current position of the cursor, where the graphic figure shows an entirety of at least one of the one or more past traces as a free-form line in a single image, such that the free form line represents the sequential positions of the user's manipulation of, and movement of, the cursor over the array of images on the display, wherein the free form line is determined by the user in accordance with the user's selection of the one or more positions among the images on the screen and by the user's desire to execute the audio data associated with the selected images, and which selection is determined by the user and not pre-determined by another entity.

* * * * *